United States Patent

Nakajima et al.

[11] Patent Number: 6,026,389
[45] Date of Patent: *Feb. 15, 2000

[54] VIDEO QUERY AND EDITING SYSTEM

[75] Inventors: Yasuyuki Nakajima, Saitama; Kiyono Ujihara; Akio Yoneyama, both of Tokyo, all of Japan

[73] Assignee: Kokusai, Denshin, Denwa, Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/905,809

[22] Filed: Aug. 4, 1997

[30] Foreign Application Priority Data

Aug. 23, 1996 [JP] Japan .................................. 8-239940

[51] Int. Cl.[7] .................................................. G06F 17/30
[52] U.S. Cl. .............................. 707/1; 345/112; 345/302; 345/328; 345/440; 345/473; 384/6; 384/7; 384/10; 384/20; 384/44; 707/10; 707/102; 707/104
[58] Field of Search .................................. 707/1, 10, 104, 707/102; 384/10, 7, 13, 6, 20, 44; 380/49; 345/302, 440, 328, 112

[56] References Cited

U.S. PATENT DOCUMENTS

| | | | |
|---|---|---|---|
| 5,029,013 | 7/1991 | Hiratsuka et al. | 358/335 |
| 5,142,620 | 8/1992 | Watanable et al. | 395/164 |
| 5,182,677 | 1/1993 | Kizu et al. | 360/14.2 |
| 5,237,648 | 8/1993 | Mills et al. | 395/133 |
| 5,442,390 | 8/1995 | Hooper et al. | 348/7 |
| 5,485,611 | 1/1996 | Astle | 395/600 |
| 5,521,841 | 5/1996 | Arman et al. | 395/328 |
| 5,606,655 | 2/1997 | Arman et al. | 395/140 |
| 5,721,829 | 2/1998 | Dunn et al. | 395/200.49 |
| 5,727,065 | 3/1998 | Dillon | 380/49 |
| 5,751,280 | 5/1998 | Abbott et al. | 345/302 |
| 5,752,246 | 5/1998 | Rogers et al. | 707/10 |
| 5,760,767 | 6/1998 | Shore et al. | 345/328 |
| 5,819,286 | 10/1998 | Yang et al. | 707/104 |
| 5,821,945 | 10/1998 | Yeo et al. | 345/440 |
| 5,835,163 | 11/1998 | Liou et al. | 348/700 |
| 5,870,754 | 2/1999 | Dimitrova et al. | 707/104 |

FOREIGN PATENT DOCUMENTS

| | | |
|---|---|---|
| 0 564 247 A1 | 6/1993 | European Pat. Off. .................. 27/31 |
| 0 613 145 A2 | 8/1994 | European Pat. Off. .................. 27/34 |
| 77100 | 3/1995 | Japan . |
| 263681 | 9/1995 | Japan . |
| 2 294 355 | 4/1996 | United Kingdom ...................... 27/34 |
| 2 300 535 | 6/1996 | United Kingdom ...................... 27/34 |
| WO 94/03897 | 2/1994 | WIPO ..................................... 27/28 |

Primary Examiner—Thomas G. Black
Assistant Examiner—Jean M. Corrielus
Attorney, Agent, or Firm—Westman, Champlin & Kelly

[57] ABSTRACT

A video query and editing system which is capable of querying images without fast-forward and playback operations, to specify an editing start or end point easily, and to lower editing cost of compressed data. An edit control window is displayed (11) first, and then a file for query and editing is selected in query and editing file processing 12. In motion picture query processing 13, image query is performed in macro or micro units for the selected file and then the images to be under the query and editing are displayed. In editing section specification 14, a start point and an end point of a section for the editing are specified out of the images displayed in the motion picture query processing. Editing of a plurality of sections or other files are performed in the same manner as for the above processing if desired. After all the editing sections are determined, the editing sections are played back in editing section playback 17 to confirm the editing parts. Afterward, the images of the corresponding parts are edited in editing 18 to record them as a new file.

25 Claims, 10 Drawing Sheets

(FILE SELECTION WINDOW)   (ICON FORM)

(FILE SELECTION WINDOW)   (LIST FORM)

(FILE NAME INPUT WINDOW)

VIDEO QUERY AND EDITING SYSTEM

BACKGROUND OF THE INVENTION

1. Field of the Invention

The present invention relates to a video query and editing system, and more particularly to a video query and editing system which is capable of querying (or retrieving) and editing images without fast-forward and playback or other operations and of specifying an editing start or end point easily. In addition, the present invention relates to a video query and editing system which is capable of querying and editing images and then transmitting only the edited parts on a network.

2. Description of the Related Art

In conventional editing of a motion picture, an editing system in which a VTR tape is used or a device in which digital data recorded in a hard disk or the like is used. For the editing system in which the VTR tape is used, a section for an edition is determined by using functions such as fast-forward and playback operations for editing works. It, however, needs a rewind or fast-forward operation by controlling the tape for every specification of an editing section, thus taking a lot of work time for editing.

On the other hand, if digital motion picture data is stored in a hard disk, it is possible to reduce editing time since an image at a specified time can be displayed at a high speed by using random access properties of the hard disk.

In both devices, however, mainly the fast-forward and playback functions are desired to be used for querying the contents of the motion picture, thus requiring much time for editing a long-time material. In addition, for editing a material covered in a distant place, a recorded VTR tape is mailed to an editing place or a picture is transmitted to the editing place while a playback operation is performed through a line for a picture display. In addition, for the digital motion picture data, the data is transferred by using a file transfer means (FTP: File transfer protocol). Therefore, in both cases, all of the material is transmitted to the editing place once and then edited, thus leading to an increase of a transmission cost.

Furthermore, if an image is coded in an MPEG system, for example, it is decoded once to restore the image so as to be recorded in a VTR or in a hard disk before editing, and after the edition, the image is coded again, whereby there is a possibility that it takes a long time for working processes previous to or subsequent to the editing or that an image quality is degraded every editing time.

As set forth hereinabove, in the conventional system, the fast-forward and playback or other operations are performed to query editing sections, whereby it has a problem that it takes a long time for editing works. In addition, to edit a picture covered in a distant place, all the pictures are transmitted to an editing place once, and therefore it has a problem that the transmission cost is increased. Furthermore, if pictures are compressed in the MPEG system, a need exists for decoding and compression for every editing, and therefore it has problems that the editing time and cost are increased and that the image quality is degraded.

SUMMARY OF THE INVENTION

It is an object of the present invention to provide a video query and editing system which is capable of reducing editing time by browsing and querying the contents of motion pictures easily, removing the conventional technical problems as set forth above.

It is another object of the present invention to provide a video query and editing system which is capable of querying and editing interactively picture data covered in a distant place connected through a transmission line to reduce transmission cost and editing works.

It is still another object of the present invention to provide a video query and editing system which is capable of reducing editing cost and preventing degradation of an image quality by editing images on coded data.

To accomplish the objects as described above, a first aspect of the present invention provides a video query and editing system having a storing means which gives access to motion picture files with random access, comprising a macro query means for querying motion picture data in units of a time from a specified start point to display images of respective times as a result of the query, a micro query means for displaying images in units of a frame from a start point which corresponds to an image selected out of the images displayed in the macro query, and a means for specifying an editing section by using an image queried by the macro query means and/or the micro query means. In addition, according to a second aspect of the present invention, the micro query means queries images of a plurality of frames in units of a group and/or in units of a scene, having a function of displaying the result of the query. Furthermore, according to a third aspect of the present invention, the editing section playback confirmation means clips an image section of intra coded frame in a state of coded data if motion picture data is compressed.

Furthermore, according to a fourth aspect of the present invention, motion picture data is stored in a WWW server, and a WWW browser is connected to the WWW server via a network so that every motion picture query and editing processing is performed in the WWW server and that the WWW browser displays the result of the queries and specifies the query and editing conditions.

Therefore, according to the present invention, it is possible to perform a high-speed query in units of a time with the macro query means and then to perform a detailed query in units of a frame, a group, or a scene with the micro query. Accordingly, the contents of motion pictures can be easily browsed and queried, thus leading to a reduction of editing time. In addition, if the motion picture data is compressed, an image section of intra coded frame is clipped in a state of coded data, and therefore it does not need to perform decoding and re-coding for editing, thus leading to reducing editing cost and preventing degradation of an image quality.

Further, according to the present invention, if the motion picture data is stored in the WWW server, every motion picture query and editing processing is performed in the WWW server and the WWW browser is used to display a result of the query and to specify the query and editing conditions, whereby picture data covered in a distant place connected through a transmission line is interactively queried and edited so as to reduce transmission cost and editing works.

DETAILED DESCRIPTION OF THE PREFERRED EMBODIMENTS

Figure 13:
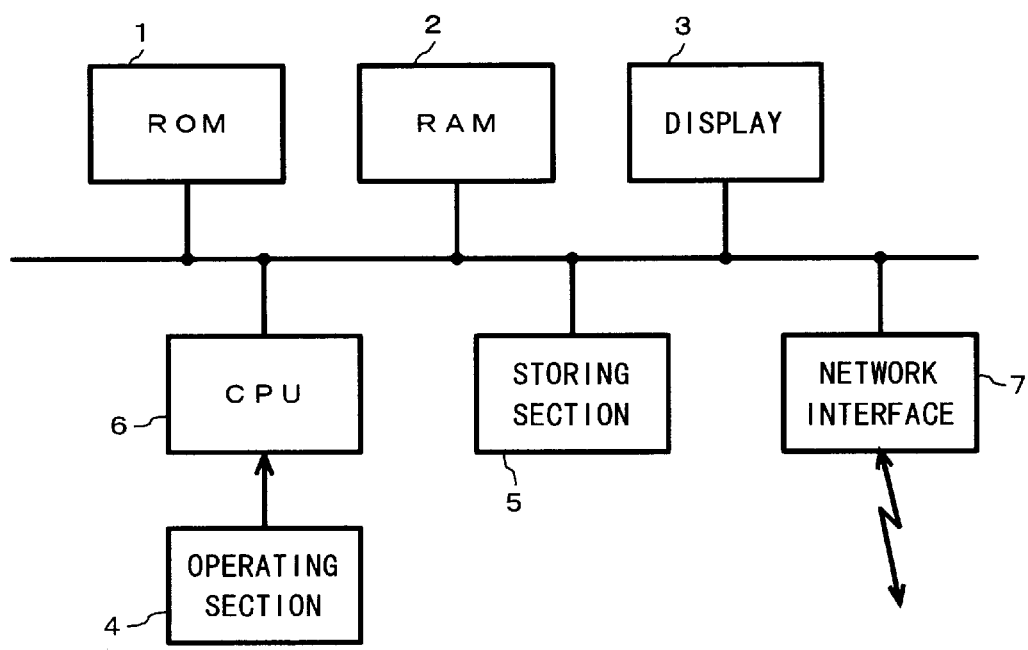
FIG. 13 is a block diagram illustrating an outline of a hardware configuration of an editing system of the present invention.

This invention will be described below by using the accompanying drawings. First, referring to FIG. 13, an explanation will be made for a schematic hardware configuration of an editing system according to an embodiment of the present invention. In this drawing, a ROM 1 includes an editing program of the present invention, and a RAM 2 serves as a work area for the editing or is used for storing temporarily parameters entered during the editing. A display 3 is used to display a window needed for the editing, composing a man-machine interface in association with various keys on an operator panel or a pointing device. A storing section 5, which comprises a hard disk or other components, stores picture materials in a plurality of files in a random-accessible form. A CPU 6 executes the editing program stored in the ROM 1 according to an input from an operating section 4, reads out a source file specified by the operating section 4 or stores in the storing section 5, further executes desired editing in the RAM 2, and then supplies window information according to each editing to the display section 3. A network interface 7 is connected to a line such as the internet.

Next, referring to a flowchart shown in FIG. 1, an explanation will be made for an outline of an operation of the editing system according to an embodiment of the present invention having the above configuration.

First, when editing is selected by the operating section 4 to start the specified processing, an edit control window display 11 is performed on the display section 3. Next, query and editing file processing 12 is executed. In this query and editing file processing 12, a file to be queried and edited is selected. In the next motion picture query processing 13, a macro or micro image query is performed for the selected file to display an image to be queried and edited. Subsequently, editing section specification 14 is executed. In this editing section specification 14, a start point and an end point are specified for a section for editing in the image displayed in the motion picture query processing. If a plurality of sections are edited, Y (Yes) is selected as a judgment of the multi-section editing 15 and an editing section is specified again in the editing section specification 14. If another file is edited, Y (Yes) is selected as a judgment of multi-file editing 16 and another file is selected in the query and editing file processing 12 to specify a query and editing section of an image. After all the editing sections are determined, an editing section is regenerated in editing section playback 17 to check a part to be edited. If the part to be edited is determined, an image of the corresponding part is edited in editing 18 to record it as a new file.

Next, each part in the flowchart in FIG. 1 will be described in detail. In the edit control window display 11, an edit control window 11a as shown in FIG. 2 is displayed on the above display section 3. If FILE 211 is selected in FIG. 2, two file control modes, Open 212 and Quit 213 are displayed. If Open 212 is selected at this point, the control moves to the query and editing file processing 12. If Quit 213 is selected, the edit control window display is quitted.

Figures 3, 4:
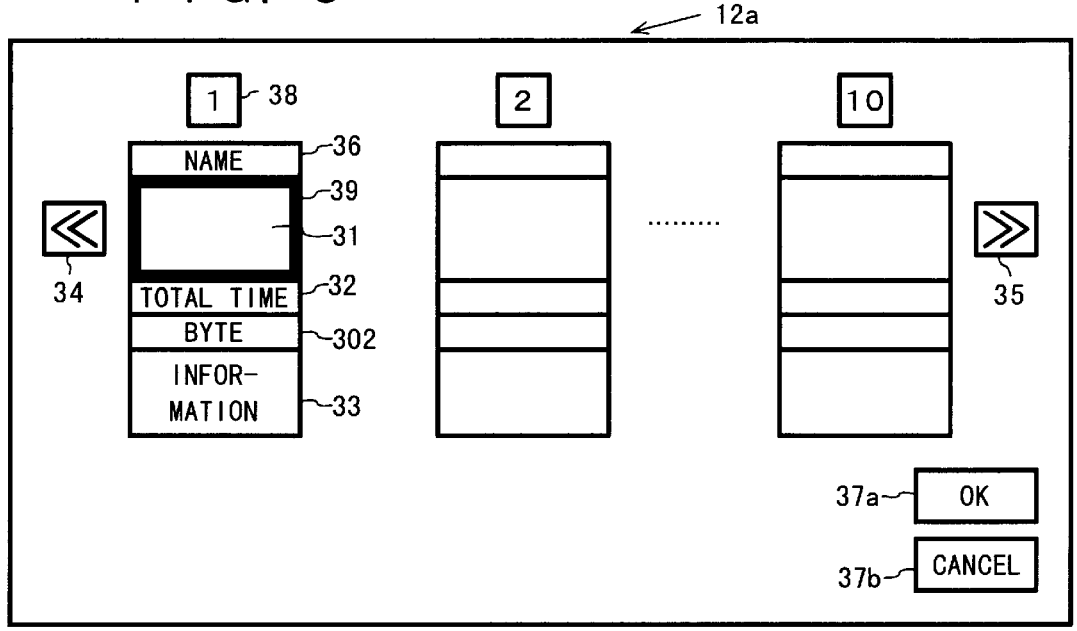
FIG. 3 is an example of a file selection window.
FIG. 4 is an example of another file selection window.

In the query and editing file processing 12, a file selection window 12a as shown in FIG. 3 is displayed on the above edit control window 11a which is opened. The file selection window 12a in FIG. 3 is used to list image files in a directory in which motion picture files are stored. In this drawing, the first file 38 is specifically described; if a plurality of files are stored in the storing section 5, these file names are displayed in the second to 10th files 38. These file display is identical, and therefore an explanation will be made below for the first file as a typical one.

Figure 7:
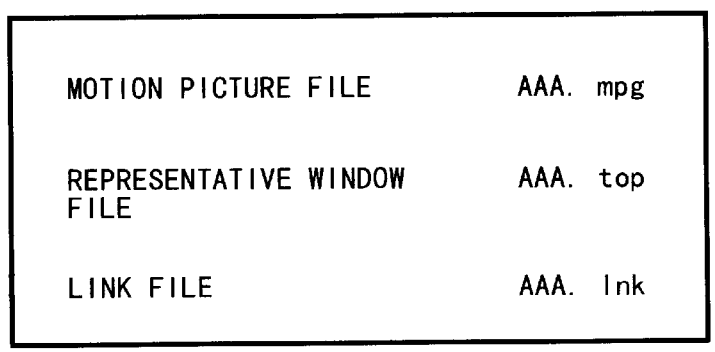
FIG. 7 is an explanation diagram of identifiers for respective files.

In Name 36, each file name is displayed. In a file representative image 31, a representative image of a motion picture file is displayed. As an example of the representative image, it is possible to use the first image of the motion picture file. If the motion picture file is compressed in the MPEG system standardized in ISO, it is possible to decode only the corresponding representative frame from the motion picture file so as to display the image. As another method, a representative image is prepared previously and then the representative image is linked to the corresponding motion picture file so as to display the image. In this case, it is possible to use a method of distinguishing the motion picture file from the representative image by means of a file descriptor as shown in FIG. 7. In addition, the representative image can be recorded using a compression method of a still image in JPEG or GIF.

In Total Time 32, a total playback time of each motion picture file is displayed. For a compressed motion picture file, a playback time is obtained with a file size/coding bit rate. If it is compressed in the MPEG system, the coding bit rate can be decoded from coded data. In addition, it is also possible to record playback time information in another file previously. In this case, it is possible to record it as a file to be linked to the original motion image file with a file descriptor, XXX. Ink as shown in FIG. 7. In Information 33, information about the motion picture file is displayed. A shooting place or time can be recorded as this information and it is recorded as a text file. This information can be recorded as a file to be linked to the original motion picture file with XXX. Ink. This link file can be shared by using its first line for the playback time information of the Total Time 32 and its second and subsequent lines for the information 33. Byte 302 is used to indicate a capacity of the motion picture file.

File list page back track 34 and page forwarding 35 have functions of returning and forwarding the list of the query and editing files in units of a page, respectively. For example, if there are ten editing part images which can be displayed on a monitor and the nth to the (n+9)th editing part images are currently displayed, the (n−10)th to the (n−1)th editing part images are displayed by means of the page back track 34.

If OK 37a is specified, the control moves to the motion picture query processing 13 for the selected image. A motion picture file can be selected by specifying the image by using a pointing device such as a mouse on the file representative image 31. In addition, when the file is selected, it is possible to indicate that the file has been selected by enclosing the representative image 31 with a frame as indicated by a selection frame 39. Cancel 37b is used for canceling query and editing file processing to return to the edit control window 11a. The file number 38 indicates a number of each motion picture file.

FIG. 4 shows another method of executing the query and editing file processing, in which each motion picture file is displayed in a list form without displaying a motion picture representative image. An file selection mark 400 is used to indicate a motion picture file to be selected; if a file is selected by a pointing device such as a mouse, the file selection mark 400 is changed from a white circle ○ to a black circle ● to indicate that it has been selected. A file number 401 indicates a number of each motion picture file. Name 40, Total Time 42, Byte 402, and Information 43 are the same as those in FIG. 3. Page back track 44 and page forwarding 45 are also the same as the page back track 34 and the page forwarding 35 shown in FIG. 3. Furthermore, OK 47a and Cancel 47b are the same as those in FIG. 3.

Referring to a flowchart in FIG. 5, the details of the motion picture query processing 13 will be described below. In query window display 51, a motion picture query window 51a is displayed as shown in FIG. 6, first. Next, in query start position specification 52, a position for starting a query is specified. Then, in macro query interval specification 53, a time interval for a macro query is specified. Subsequently, a macro query is started in macro query starting 54 and a result of a query is displayed in macro query result display 55. In micro query start position specification 56, a position at which a micro query is to be started is specified on a macro query result window. Furthermore, in micro query mode specification 57, a micro query mode is specified. Subsequently, a micro query is started in micro query starting 58, and then a micro query result window is displayed in micro query result display 59. This processing procedure will be described specifically below.

If OK 37a or 47a is specified in FIG. 3 or FIG. 4 described above, the file selection window (FIG. 3 or FIG. 4) is deleted, and then a motion picture query window 51a composed of a File Browser window 620, a Macro Browser window 621, and a Micro Browser window 622 is displayed as shown in FIG. 6. In a File Browser image window 61, a representative image of a file selected in FIG. 3 or FIG. 4 is displayed first, and then a file name for a query and editing is displayed in the topmost file name 60.

Figure 5:
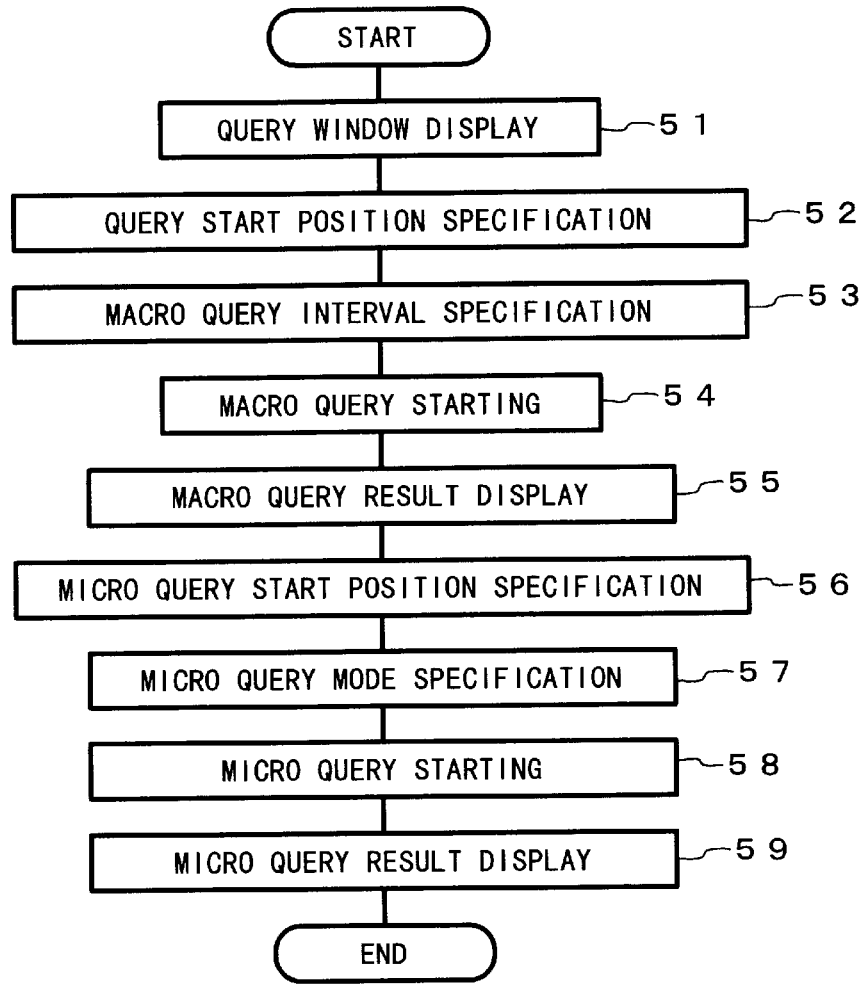
FIG. 5 is a flowchart illustrating details of motion picture query processing shown in FIG. 1.
Figure 6:
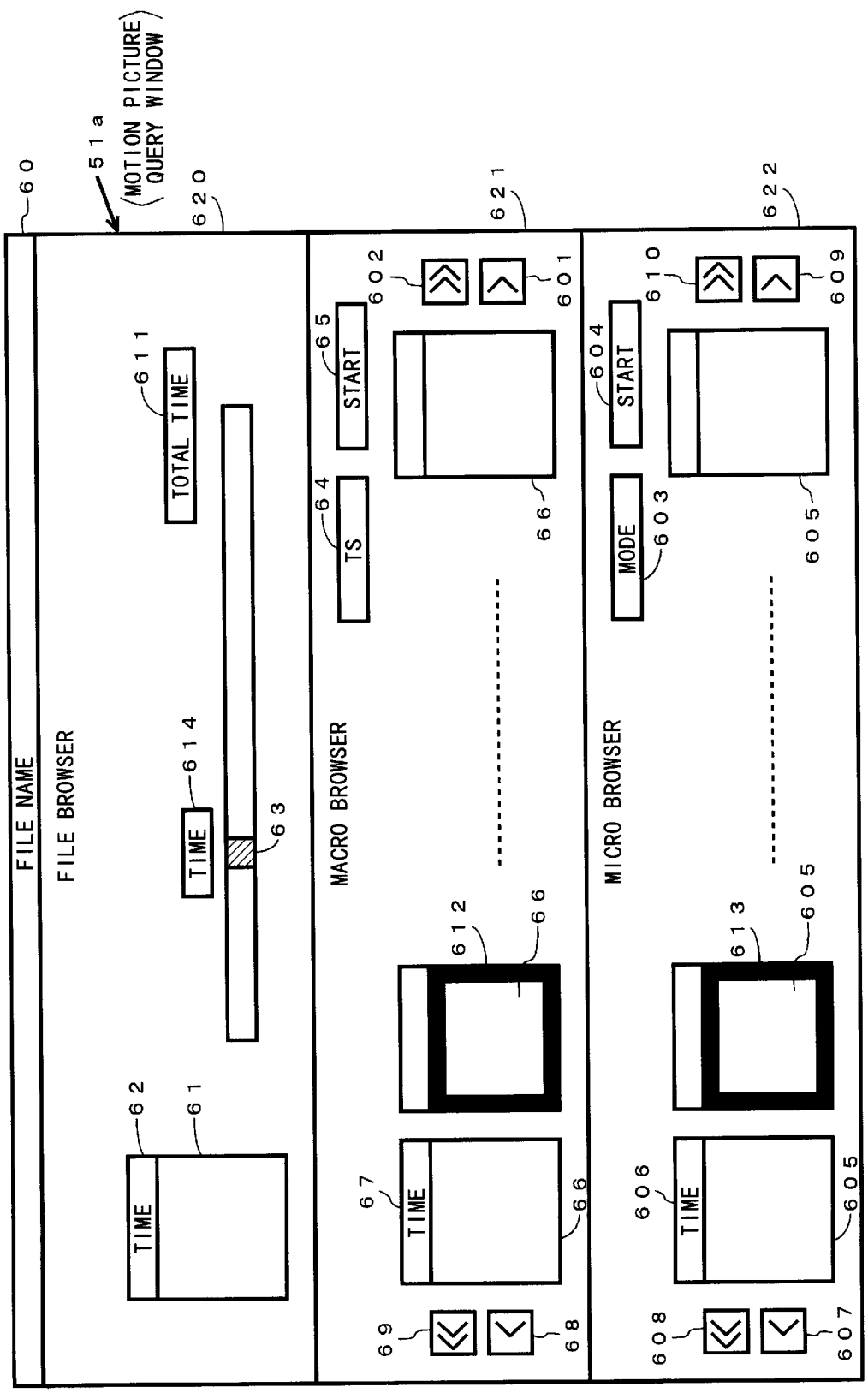
FIG. 6 is an example of a motion picture query window.

On the File Browser window 620, the query start position specification 52 in FIG. 5 is executed. A motion picture file cursor 63 is a cursor for specifying a query start position of a motion picture. By shifting this cursor 63, the query start position changes. Additionally, according to the cursor position, an image at the position is displayed in the File Browser image window 61. Furthermore, in connection with the cursor 63, Time 614 is displayed above the cursor. In an initial state, however, the first image is displayed in the File Browser image window 61 and the time for the image is displayed in a Time field 62. The cursor 63 is set at the left end.

Total Time 611 indicates a total playback time for a motion picture file. How to obtain the playback time is the same as one for the Total Time 32 in FIG. 3. In addition, the contents of the Time field 62 represents a time for a specified image. This time, however, is the same as one for the Time 614. As a displaying method of this time, the following method can be used. First, it is supposed that K % indicates a specified cursor position to the cursor entire length. The total playback time, Total Time, is modified to a time in seconds so as to be TT sec. A value for TP sec from an equation, TP=TT×K/100, and then the TP sec is modified into a form of hours, minutes, and seconds so as to be displayed as a specified image time.

In addition, an image to be displayed can be determined by using the method described below. Supposing that TC is a file capacity, an image is displayed which exists in a file position FP obtained from an equation FP=TC×K/100. For image data compressed in MPEG, time information is obtained from a group of picture (GOP) header near the file position FP. On the basis of this time information, a query is performed for GOP including an image at the specified time from the previous and subsequent GOP headers. After the query, the corresponding GOP is decoded from the beginning and then the image at the corresponding time is displayed.

The Macro Browser window 621 is used to query images in macro units for an image specified on the File Browser window 620. The Macro Browser window 621 is used to display an image in a specified time step TS from the image in the image window 61 specified on the File Browser window 620. TS 64 is a time step, and a user can specify an arbitrary step such as, for example, 5 sec or 30 sec. It is used for the macro query interval specification 53 in FIG. 5.

Start 65 is used to start an image display in a specified step, whereby the macro query starting 54 in FIG. 5 is performed; if the Start 65 is selected, a macro query image 66 and a query time 67 are displayed to perform the macro query result display 55 in FIG. 5. For an image to be displayed, an image at a query start position TP is displayed in the macro query image 66 at the left end, and afterward the macro query images 66 are sequentially displayed in the right direction in order of TP+TS, TP+2TS, and after. An image to be displayed can be determined based on a specified time TQ and a total file amount TC. Supposing that FPS is a file position of the image to be displayed, FPS can be obtained from an equation, FPS=TC×TQ/TT. In the macro query image 66, an image at a specified time can be displayed in the same manner as for the File Browser image 61.

Query window page back track 69 and query window page forwarding 602 are functions of moving query images backward and forward in units of a page, respectively. Query window back track 68 and query window forwarding 601 are functions of moving query windows backward and forward in units of a window, respectively. If one is selected out of the displayed macro query images 66 by using a pointing device such as a mouse, a selection frame 612 indicating a selection is displayed on the window, so as to be a start point of micro query images in the micro query start position specification 56 in FIG. 5 and also an editing point. Furthermore, if the Start 65 is selected with changing the time step TS 64 in a state that an image is selected, it is also possible to display images in the specified time step with an image specified on the File Browser window 620 being treated as a start point.

Micro Browser window 622 is used for an image query in smaller units for an image specified in the macro image query window 621. Mode 603 is used to specify a mode for a micro image query, by which micro query mode specification 57 is performed. There are mode types for the query such as single frame, multi-frame, group of pictures (GOP), and scene which can be specified. The single frame indicates a physically minimum unit of an image. The GOP indicates grouped images. For example, the GOP is composed of an image group of 15 frames in images compressed in the MPEG system. In addition, it is also possible to group images by an arbitrary number of frames. The scene is a set of images having an identical scene between scene change points.

If query images are displayed in units of a multi-frame, it is possible to use a method of counting the number of frames based on images specified on the macro image query window 621 and displaying them when it reaches the predetermined number of frames. Additionally, if images are compressed in the MPEG system, it is possible to use a method of detecting GOP Start Code indicating a start point of a GOP to find the start point of the GOP and then decoding its first image (a single picture) so as to be displayed. For images in units of a scene, a scene change point is detected to display an image at that point. For a detection method of the scene change point, it is possible to detect a scene change point from MPEG image data by using "a cut point image detecting apparatus for motion picture" such as is disclosed in Japanese Patent Application No. 263681/1995 filed Sep. 19, 1995, to Ujihara et al. for example. In addition, by detecting the transition point of the scene in advance and storing only a time of the transition point in a file (XXX. CUT) having a descriptor CUT, an image at the transition point can be loaded from an original image file based on the time of the transition point so as to be displayed. It is possible to use the same method as for the File Browser image 61 to display an image at a specified time.

As another method, it is possible to store images of a GOP or of a scene as an image file and to use the image file to display the images of the GOP or the scene. In this case, it is possible to indicate links to original motion picture files and attributes of respective files as a file having a descriptor GOP or SCN (XXX. GOP, XXX. SCN). For this type of files, compression systems of still images, JPEG or GIF, can be used.

Start 604 is used to start a display of a micro query image from an image specified on the Macro Browser window 621 in a specified query mode (Mode 603), by which the micro query start 58 in FIG. 5 is initiated. Micro query window 605 is used to display images from an image of the start point specified sequentially in the right direction in a specified query mode, whereby the micro query result display 59 in FIG. 5 is performed. Time 606 is used to indicate a time for an image which is displayed.

The query window page back track 608 and the query window page forwarding 610 are functions of moving the query windows backward or forward in units of a page, respectively. In addition, the query window back track 607 and the query window forwarding 609 are functions of moving the query windows backward or forward in units of a window, respectively. If one of the displayed micro query images 605 is selected by using a pointing device such as a mouse, a selection frame 613 for indicating a selection is displayed on the window so as to be used as an edition start point or an edition end point or a start point of micro query images in another mode. If the selection frame 613 is displayed on the Micro Browser window 622, the above selection frame 612 on the Macro Browser window 621 disappears.

Furthermore, if one of the images displayed as query images is selected and the Start 604 is selected with the Mode 603 changed, a micro query is performed in new retrieval conditions by using the selected image as a start point and then a result of the query is displayed. Therefore, it is possible to query target images efficiently under a plurality of query conditions.

Figure 1:
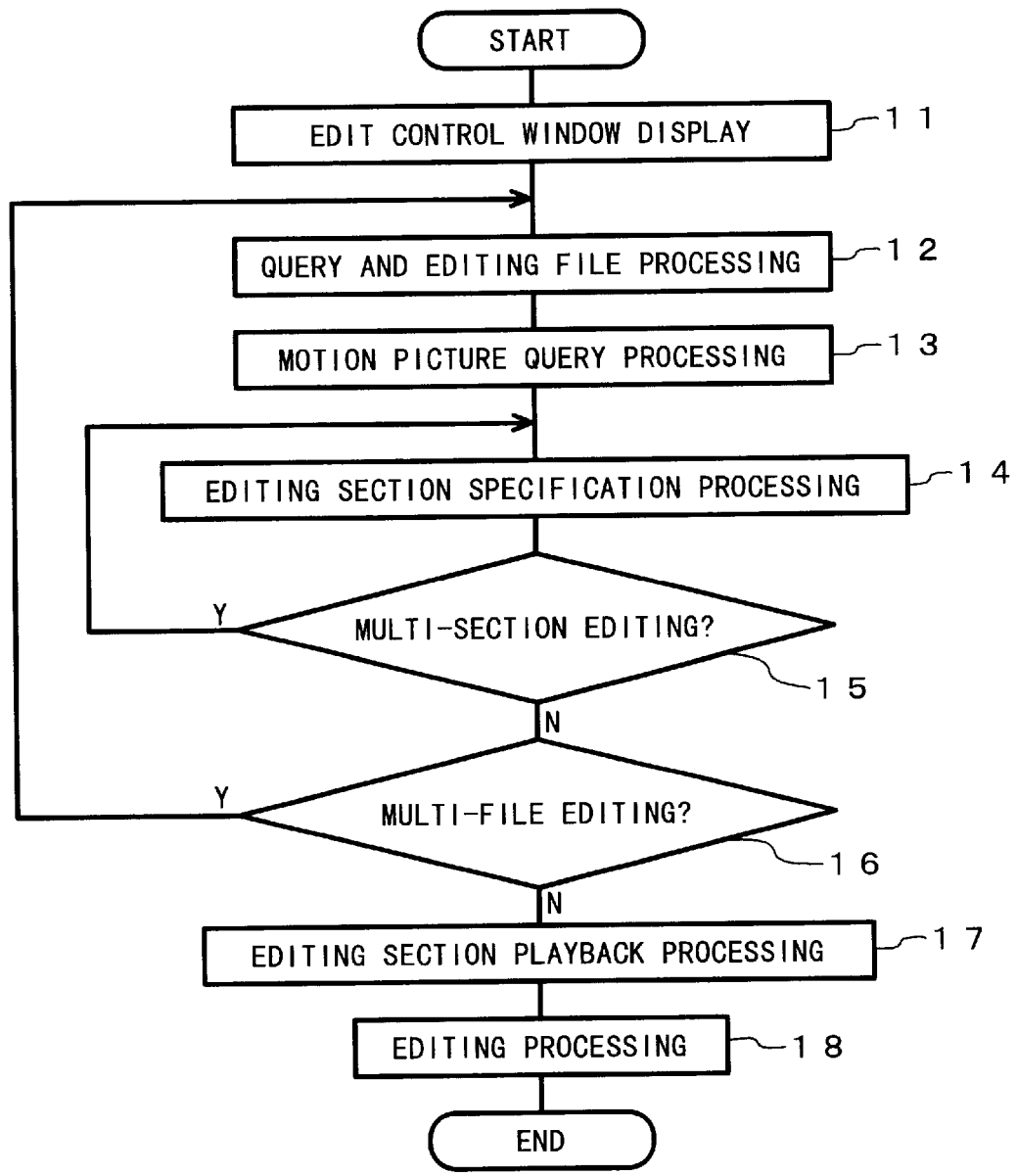
FIG. 1 is a flowchart illustrating an outline of the entire processing of an editing system of the present invention.
Figure 2:
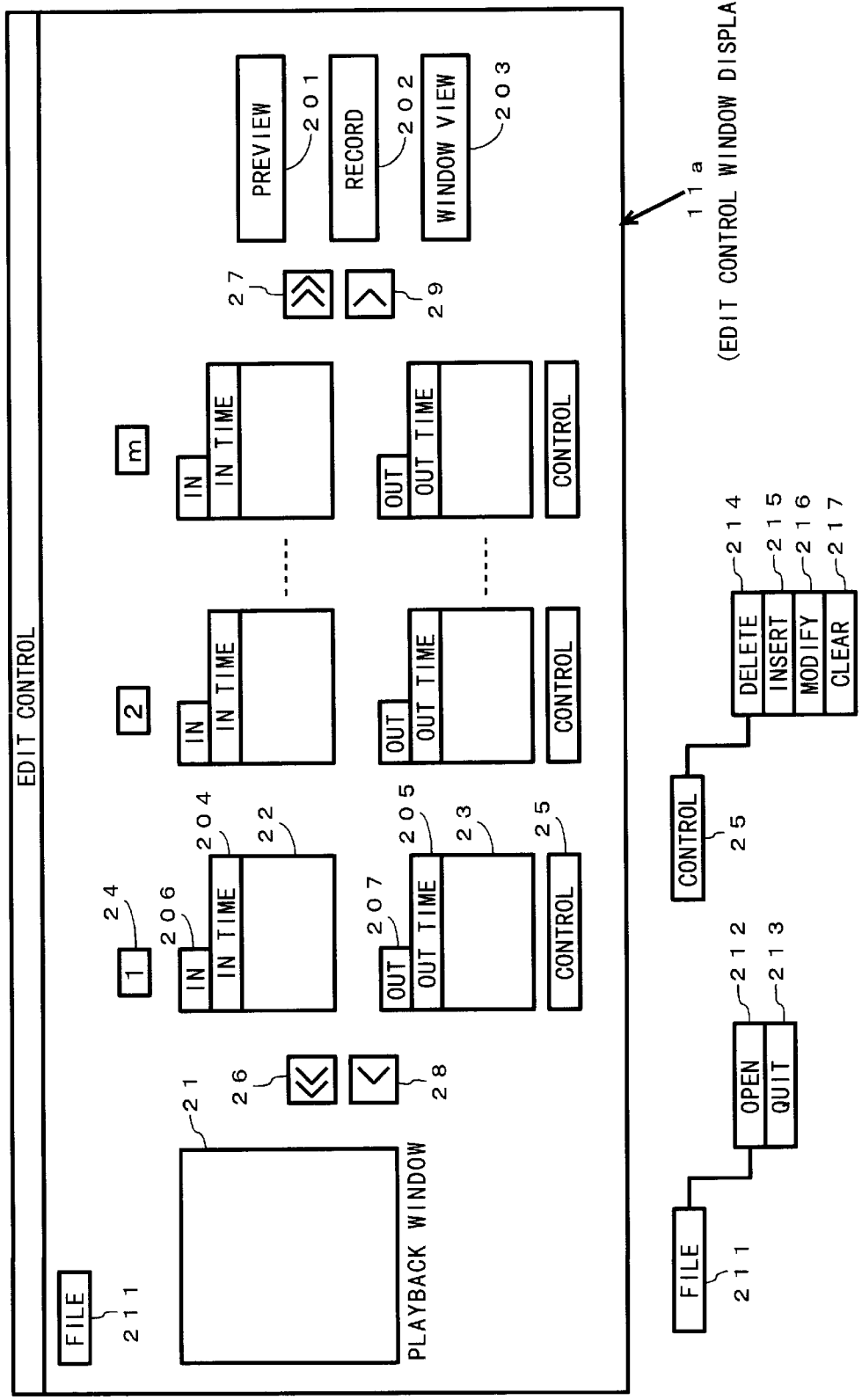
FIG. 2 is an example of an edit control window.

After the motion picture query processing 13 in FIG. 1 is completed through the above processing, the control moves to the next editing section specification 14. In the editing section specification 14, an editing section is specified on the motion picture query window 51*a* in FIG. 6. As described above, the selection frame 612 or 613 is displayed on the image selected in FIG. 6. If IN 206 on the edit control window 11*a* (See FIG. 2) is selected with this selection frame being displayed, an image in the selection frame becomes an editing start point. Next, if an image is selected as described above to display a selection frame on the Macro Browser window 621 or the Micro Browser window 622 in FIG. 6 and then OUT 207 is selected, an image in the selection frame becomes an editing end point.

In this case, if the start point IN 206 is selected, a time for the selected image is displayed in the In Time 204 and a previously selected image is copied as an image at which editing is started in the editing start image 22. If the end point OUT 207 is selected, a time and an image are displayed in the Out Time 205 and the editing end image 23 in the same manner, respectively. As another method, it is also possible to use a method of moving the selected image to an image at the editing start point or at the editing end point with being selected by a pointing device such as a mouse and then copying the selected image in a position where the selection with the mouse is released.

If there are plurality of editing parts in an identical material, an image is selected as described above to display the selection frame again on the Macro Browser window 621 or the Micro Browser window 622 in FIG. 6, an edition number 24 indicating an editing position is shifted to the next number, and IN and OUT are selected again, whereby an editing part in another editing section can be specified. Then, the editing parts in the plurality of sections can be collected. For example, if there is a motion picture material for 10 min, an editing section 1 for two min from a time 01 min: 00 sec to another time 02 min: 59 sec is registered in the first edition number 24 and an editing section 2 for four min from a time 05 min: 00 sec to 08 min: 59 sec is registered in the second edition number 24, so that a motion picture for six min can be created by putting them together. In an example shown in FIG. 2, m editing sections can be edited.

Furthermore, if editing parts are selected out of a plurality of motion picture materials (files), FILE 211 on the edit control window 11*a* is specified to open the file selection window 12*a* shown in FIG. 3 or FIG. 4, and a motion picture file for edition is specified on the file selection window 12*a* to display the corresponding motion picture query window 51*a*, whereby the query editing parts can be specified with the same operation as set forth above.

Figure 8:
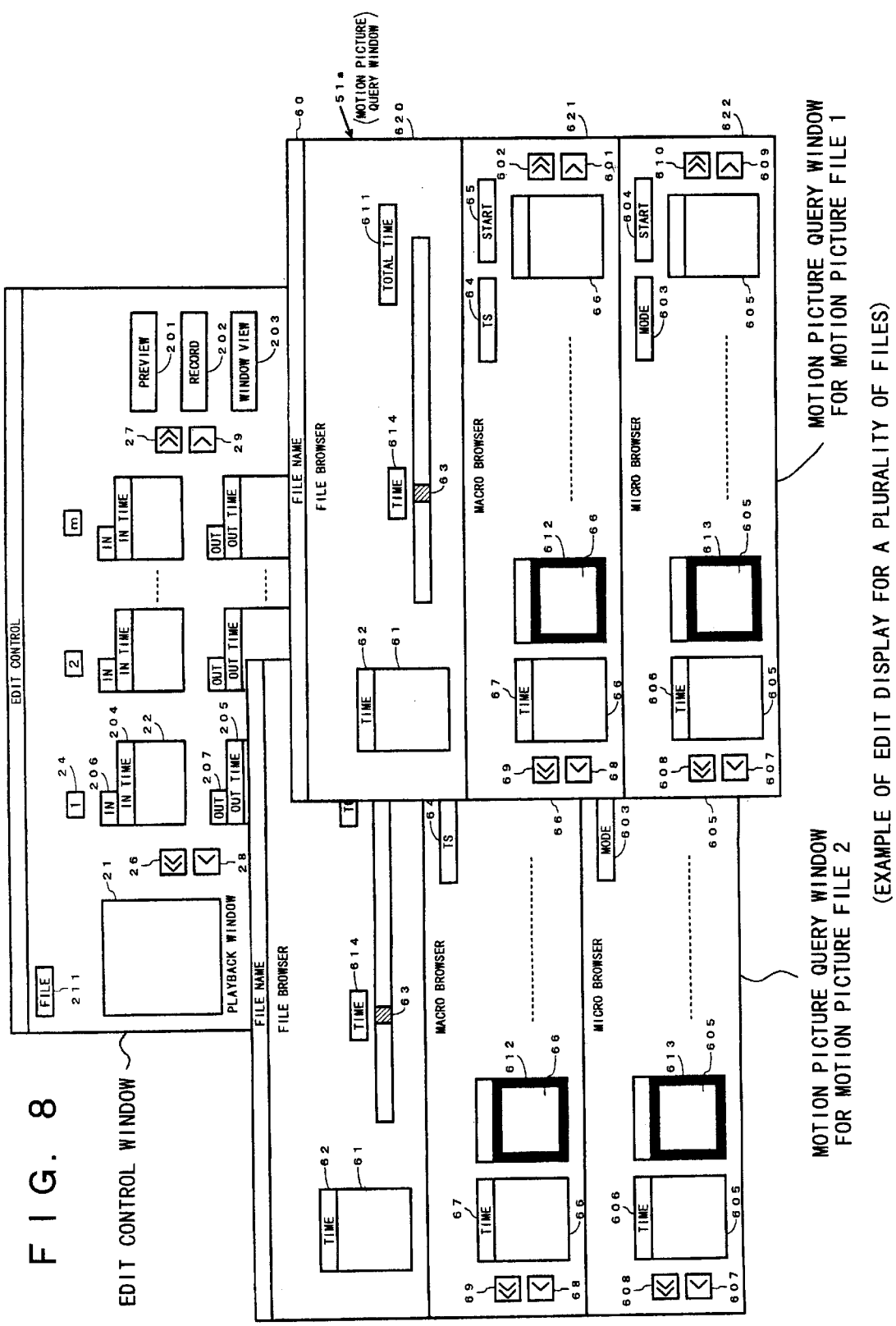
FIG. 8 is a diagram illustrating an example of an edit display for a plurality of files.

In this case, for example, if editing parts are specified in two motion picture files, it is possible to specify the editing parts on the edit control window with the motion picture query window being opened each for the motion picture file 1 and the motion picture file 2 as shown in FIG. 8.

Control section 25 on the edit control window 11*a* in FIG. 2 is used to control insertion or deletion of each editing part; if the Control section 25 is selected, four control modes, Delete 214, Insert 215, Modify 216, and Clear 217, are displayed. The Delete 214 function is used to delete the corresponding editing part; in this case, the editing part to the right side is shifted to the left side by a single part for the display. In addition, if the Insert 215 is selected, an editing part to the right side is shifted to the right side by a single part so as to blank the editing part in the right side. With this operation, it becomes possible to insert the editing part newly specified on the motion picture query window. The Modify 216 is used to modify an editing section in the same file; a motion picture query window of the currently specified motion picture file is displayed as a topmost window so as to modify a specification of an editing section. For example, if the editing section 1 and the editing section 2 are specified from the motion picture file 1 and the motion picture file 2, respectively, a specification of the Modify 216 for the editing section 2 makes the motion picture query window (the window 51a in FIG. 6) on the motion picture 2 to be displayed as the topmost window. The Clear 217 is used to blank the corresponding editing part, whereby an editing part newly specified on the motion picture query window can be set in the blanked editing part as a new editing part.

The edit display page back track 26 and the edit window page forwarding 27 functions are used to move editing parts backward and forward in units of a page, respectively. The edit display back track 28 and the edit display forwarding 29 functions are used to move editing parts backward and forward in units of a window, respectively.

Figure 9:
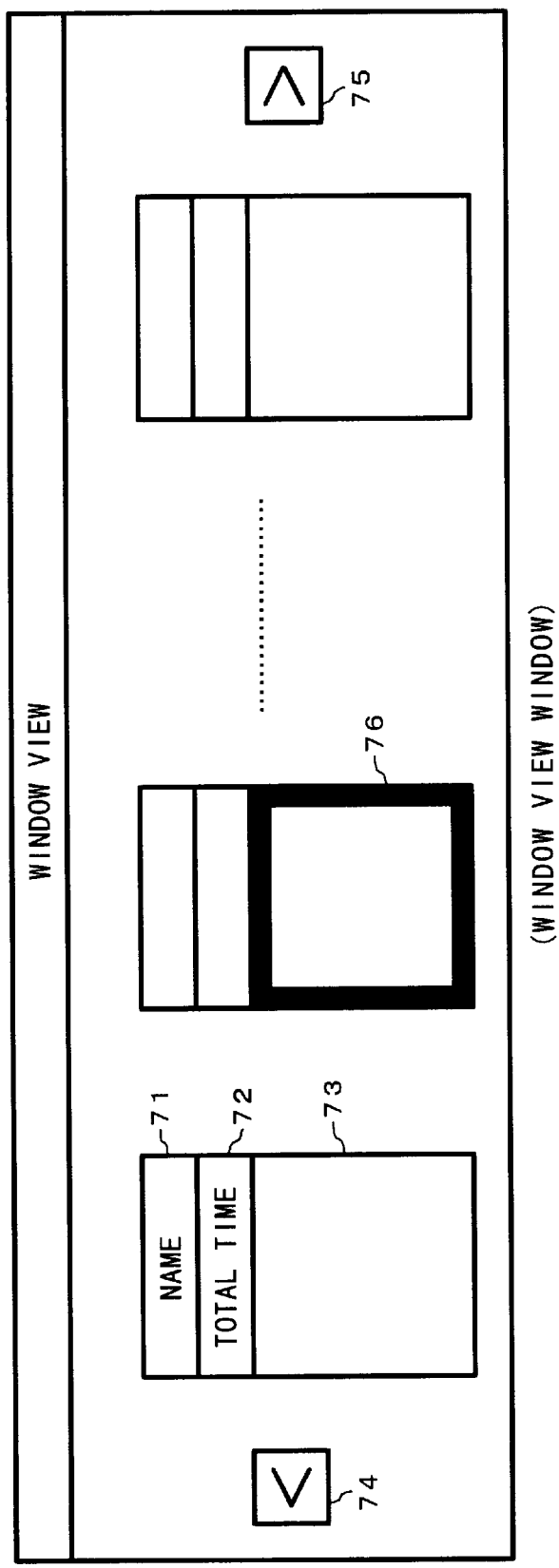
FIG. 9 is an example of a window view display.

Window View 203 shows a list of files currently opened for edition. If the Window View 203 is selected, the Window View window as shown in FIG. 9 is displayed. In Name 71, names of files currently opened for edition are displayed. In Total Time 72, a total playback time is displayed. In file representative window 73, a representative window of a file is displayed. These items can be displayed by using the same method as for the file selection window 12a shown in FIG. 3. If the file representative window 73 is specified by a pointing device such as a mouse, a selection frame as indicated by 76 is displayed and the motion picture query window (the window 51a in FIG. 6) on the selected motion picture file is displayed as the topmost window.

In editing section playback processing 17 in FIG. 1, the editing section specified in the editing section specification 14 can be played to be used for confirmation of the editing section. If Preview 201 is selected on the edit control window 11a (See FIG. 2), images from an editing start image 22 to an editing end image 23 are regenerated. If there are a plurality of editing sections, however, the plurality of editing sections are continuously played according to the edition number 24. In addition, it is possible to add pause or other functions, if necessary.

For a playback from an MPEG file, for example, initialization information is read out from a sequence header of the file and then information is skipped to a specified file pointer using a file seek function. After detecting the GOP header near the pointer, a time code existing in the detected GOP header and time codes existing in the previous and subsequent GOP headers are retrieved to search a GOP containing a target time code. For GOPs containing a target time code, decoding is started sequentially and continues playback processing up to the time code at an end of the edition. If there are a plurality of editing sections, the playback processing for the editing section is performed with the sequence header of the file and the file seek, too.

Figure 10:
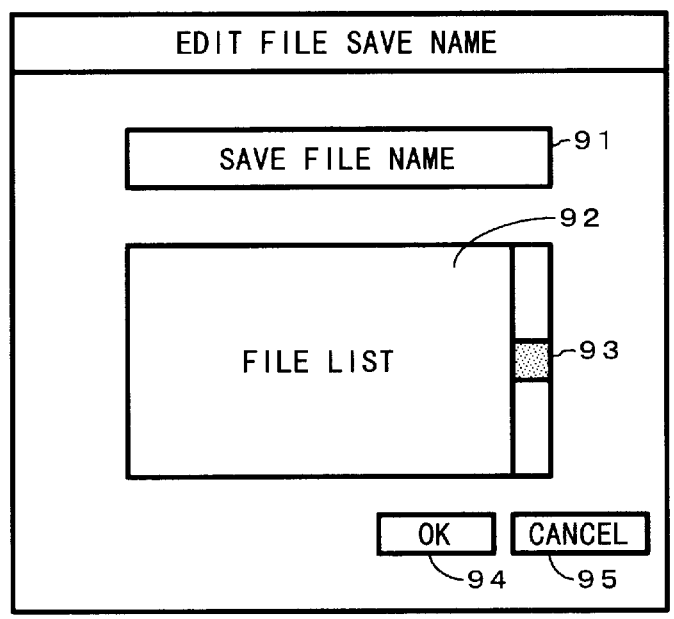
FIG. 10 is a diagram illustrating an example of a file name input window.

In the editing 18 in FIG. 1, editing is performed for a determined editing section. If Record 202 is selected in the edit control window 11a, a file name input window for recording after editing appears as shown in FIG. 10. Save File Name 91 is an area for entering a file name to be saved. File list 92 is used for displaying a list of files which have been already saved. A list moving cursor 93 is used for a retrieval of lists previous to and subsequent to the file list which is displayed. OK 94 is used for editing of the specified editing section and saving the edited file with a specified saving file name. Cancel 95 is used for interrupting editing and returning to the edit control window.

For editing of the editing section, a method as described below can be used. First, if there is only a single editing section, motion picture data for the corresponding section is extracted from an original motion picture file to create a new motion picture file. If the image data is compressed in MPEG, it is possible to extract the corresponding section in units of a GOP having an intra-frame coding picture such as an I picture and to create a single editing file beginning with sequence header information and with a sequence end code added at an end portion so as to create a single editing file. In this case, however, it is necessary to search a video buffering verifier (VBV) again for controlling a buffer amount and to change the VBV value in the coded data to a new one, if necessary. With this processing, it becomes possible to edit compressed data without decoding, and therefore it does not need to decode the encoded image data to image data once and then to encode it again after editing. In addition, the image is not degraded in comparison with the image before editing since coded data is used as it is.

If there are a plurality of editing sections, the corresponding plurality of sections are extracted from the original motion picture file and then the sections are connected to create a new motion picture file. If the image data is compressed in MPEG, the corresponding sections are basically extracted in units of a GOP to be connected. Afterward, a single editing file can be created beginning with sequence header information and with a sequence end code added at an end portion. If a coding rate depends on an editing section, however, it is necessary to perform a rate conversion so that they are unified into a single coding rate to connect the sections. For the rate conversion, it is possible to use "a rate conversion method and apparatus for image coded data" as is disclosed in Japanese Patent Application No. 77100/1995 to Nakajima et al. filed Mar. 9, 1995. Furthermore, for controlling the buffer amount, it is necessary to perform the same processing as for a single section.

As a modification, it is possible to repeat the judgment of the multi-section editing 15, the judgment of the multi-file editing 16, or the editing section playback 17 a plurality of times if desired or to change their order for processing in the query and editing flowchart in FIG. 1.

Figure 11:
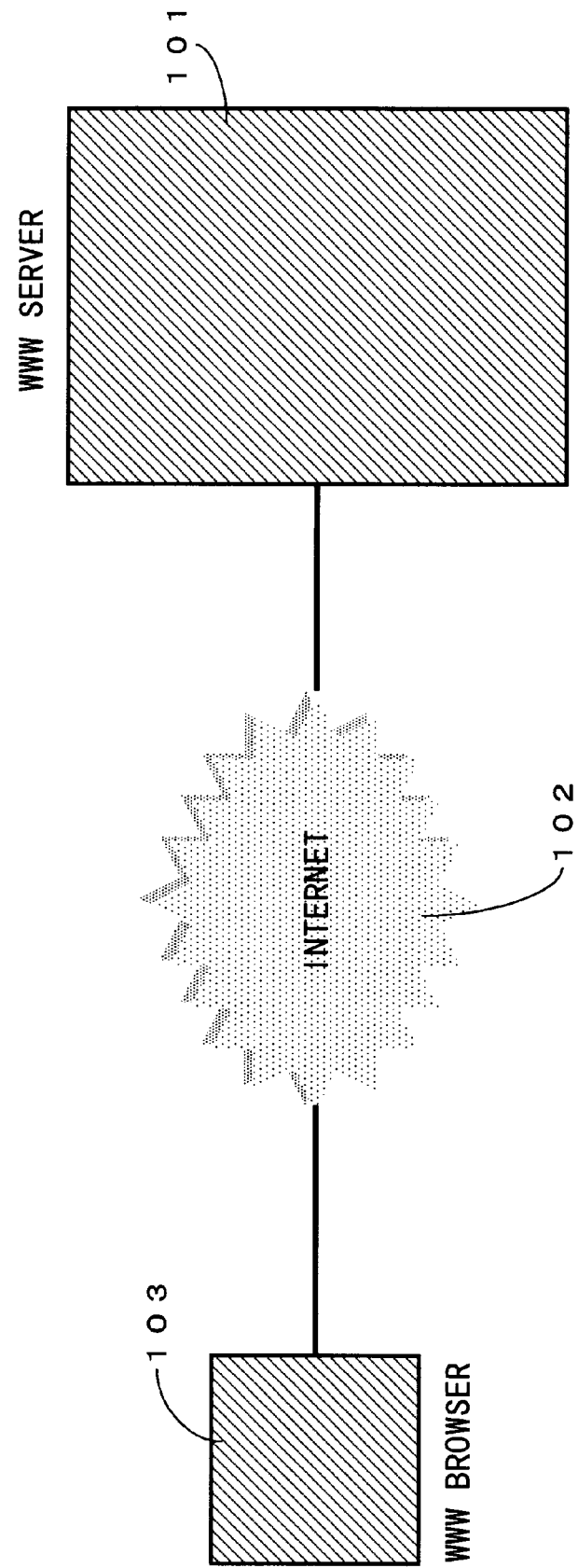
FIG. 11 is a diagram illustrating an example of a network connection.

Next, a second embodiment of the present invention will be described with reference to FIG. 11. This embodiment relates to query and editing processing for a case that a data base is connected from a query terminal via a network such as the Internet. An example of the network connection is shown in FIG. 11. In a WWW server 101, files such as image data, query windows, and query conditions are saved. As WWW server software, commercially available software can be used. A WWW browser 103 is connected to the WWW server 101 via the Internet 102, containing software in which WWW page can be browsed. As this software, commercially available WWW browser software can be used.

The WWW server 101 contains an image query and editing processing procedure described in the hyper text markup language (HTML). This procedure is a query and editing procedure described in the first embodiment; if the WWW browser 103 specifies a uniform resource locator (URL) having the WWW server 101, the edit control window 11a shown in FIG. 2 is displayed on the WWW browser 103. If the FILE 211 is specified in the WWW browser 103, the specified information is transferred to the WWW server 101 and the OPEN 212 and the Quit 213 are displayed on the WWW browser 103 via a common gateway interface (CGI). By returning a response to the displayed window in this manner, a result is sent to the WWW browser 103, so that all query and editing works in the query and editing flowchart shown in FIG. 1 can be performed on the network.

In the WWW browser 103, however, the operations are limited to selections of processing and specifications of parameters for the query result or the like, and actual editing or query processing is performed in the WWW server 101. Furthermore, the edited files are stored in the server 101, and therefore the files need to be transferred by using the hyper text transfer protocol (HTTP) or the file transfer protocol (FTP) when it is transferred to the WWW browser 103.

If a playback confirmation is performed by using Preview 201 in the editing section playback 17, the playback is performed in the WWW browser 103; since a file to be played back exists in the WWW server 101, it is transferred to the WWW browser 103 once by the HTTP or the like for the playback and then a motion picture file is played back in the WWW browser 103. Additionally, by specifying in the WWW browser 103 it is possible to send only edited sections instead of all the sections of motion picture file, which may reduce the transfer time.

Figure 12:
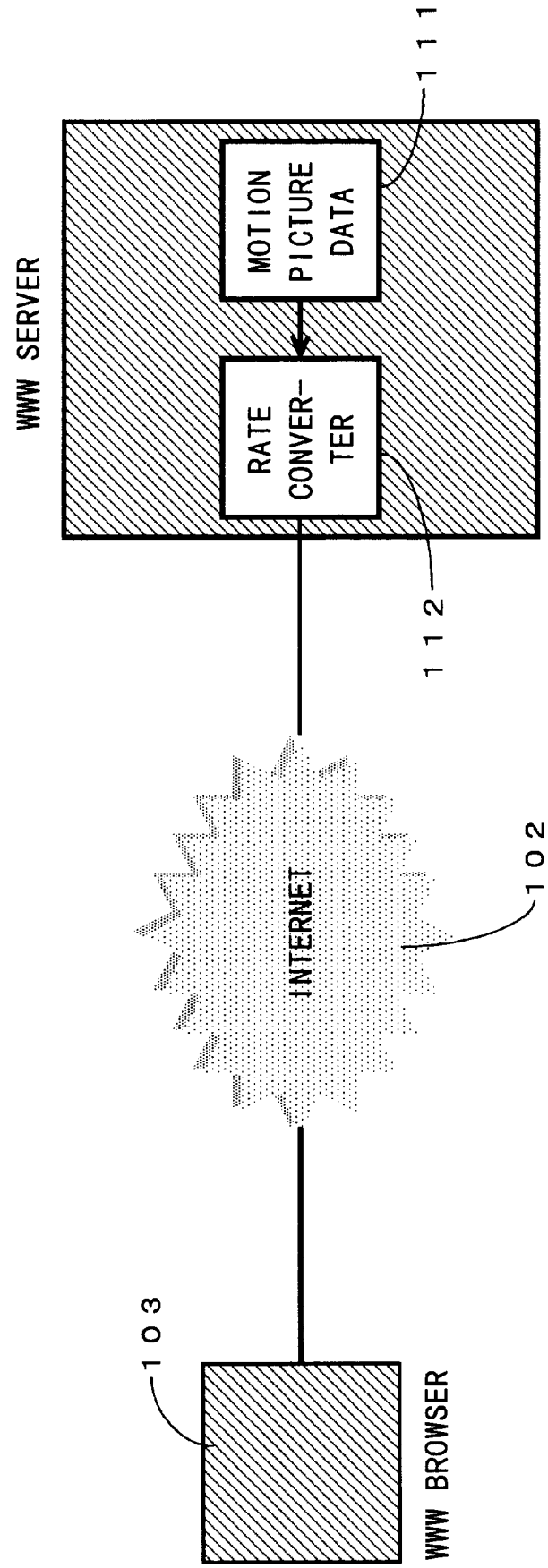
FIG. 12 is a diagram illustrating an example of a network connection having a rate conversion.

Next, a third embodiment of the present invention will be described with reference to FIG. 12. In this embodiment, if a compressed motion picture file is used in the playback confirmation of the second embodiment, a compression rate is increased further than that of the original file to convert it into a smaller file size and then it is transferred. FIG. 12 illustrates an example of a network connection having a coding bit rate conversion, and the WWW browser 103 and the Internet 102 are the same as those in FIG. 11. In the WWW server 110, there are motion picture data 111 and a rate converter 112; the motion picture data 111 is transferred to the WWW browser 103 via the rate converter 112. As a rate conversion method, it is possible to use "a rate conversion method and apparatus for image coded data" as is disclosed in Japanese Patent Application No. 77100/1995 to Nakajima et al. filed Mar. 9, 1995. This makes it possible to reduce the data size significantly so as to shorten the transfer time.

In addition, a motion picture file which is not compressed can be transferred after compression, or a spatial resolution or a temporal resolution can be decreased to reduce the data size instead of a rate conversion. In decreasing the spatial resolution, a data amount can be reduced to 1/mn by sampling an image with a ratio of n:1 in a vertical direction and m:1 in a horizontal direction (m and n are positive integers), for example. In decreasing the temporal resolution, a data amount can be reduced to 1/k by sampling the number of frames with k:1 (k is a positive integer).

According to the present invention, image data is queried in the macro and micro units to display an image to be queried, whereby the image to be queried can be easily found out. In the macro query, a time unit for the query is changed, whereby a query interval can be adjusted according to a length of motion picture data. Furthermore, in the micro query, the query modes such as scene, GOP, and frame modes make it possible to query images so as to comply with various query requests. Conventionally, images have been queried by playback or fast-forward operations on motion pictures, and therefore it needs a great deal of query works and takes much time for the query works. According to the present invention, however, it can be significantly reduced.

In addition, according to the present invention, an editing point can be easily set based on the queried image and compressed image data can be edited without being returned to an image once, whereby the editing time and cost can be significantly reduced.

Furthermore, according to the present invention, image data existing in a server connected via a network can be queried or edited, whereby a work amount and a work cost are significantly reduced in comparison with the conventional ones needed since all images are required to be transferred for editing.

Still further, according to the present invention, deleting coding rates is introduced for confirmation of editing sections, whereby work time and cost needed for confirmation can be greatly reduced.

What is claimed is:

1. A hierarchical video query and editing system having storage means which can access any frame of a motion picture file, said hierarchical video query and editing system comprising:

file browsing means including means for specifying an image existing at a predetermined position of a specified video file and means for displaying the specified image; and video browsing means, which, with the image specified by said file browsing means being the start point, simultaneously displays a plurality of images at scene change points existing after said start point.

2. A hierarchical video query and editing system as set forth in claim 1, further comprising:

means for specifying a start point and an end point for images displayed in the video browsing means;

means for displaying an image and a time code corresponding to the start point of an editing section;

means for displaying an image and a time code corresponding to the end point of the editing section;

means for starting a playback from the time code of the start point of the editing section and continuing the playback until the time code of the end point; and means for cutting out specified editing sections from the original video file and generating a new video file consisting only of editing sections.

3. A hierarchical video query and editing system as set forth in claim 2, further comprising:

means for displaying the time codes and images corresponding to the start and end points of a plurality of editing sections in the order of time of editing, thereby to edit a plurality of editing sections.

4. A hierarchical video query and editing system as set forth in claim 3, comprising:

a plurality of file browsing means, one for each of a plurality of video files, for editing the plurality of video files; and a plurality of video browsing means, one for each of a plurality of video files, for editing the plurality of video files.

5. A hierarchical video query and editing system as set forth in claim 1, wherein motion picture data is stored in a WWW server, which is connected to a WWW browser through a network in accordance with a uniform resource locator (URL) specified by the WWW browser, the hierarchical video query and editing system further comprising:

means for sending a result of a query from the WWW server to the WWW browser by using a hyper text transfer protocol (HTTP), and displaying its image by the WWW browser;

means for displaying an image and a time code corresponding to the start point of a specified editing section informed with the HTTP from the WWW server; and editing means residing in the WWW server for editing an editing section specified by the WWW browser, after the WWW server receives information for the specified video file and editing section, to generate a new video file.

6. A hierarchical video query and editing system according to claim 5, wherein the parameters for the playback confirmation of the editing section are set on the WWW browser and wherein conditions for the playback confirmation are informed from the WWW browser to the WWW server, the hierarchical video query and editing system further comprising:

means for performing a coding rate conversion on the WWW server for a compressed motion picture file existing on the WWW server prior to sending the data to the WWW browser; and means for reducing the amount of data in a non-compressed motion picture file existing on the WWW server prior to sending the data to the WWW browser.

7. A hierarchical video query and editing system according to claim 6, wherein the means for reducing the amount of data in a non-compressed motion picture file comprises:

means for decreasing the spatial or temporal resolution of the motion picture file.

8. A hierarchical video query and editing system according to claim 6, wherein the means for reducing the amount of data in a non-compressed motion picture file comprises:

means for performing coding on the motion picture file.

9. A hierarchical video query and editing system having storage means which can access any frame of a motion picture file, said hierarchical video query and editing system comprising:

file browsing means including means for specifying an image existing at a predetermined position of a specified video file and means for displaying the specified image;

first video browsing means which simultaneously displays a plurality of images existing at specified intervals after said specified image; and second video browsing means, which, with an image selected from the images displayed by said first video browsing means being the start point, simultaneously displays a plurality of images at scene change points existing after said start point.

10. A hierarchical video query and editing system as set forth in claim 9, further comprising:

means for specifying a start point and an end point for images displayed in the first video browsing means and second video browsing means;

means for displaying an image and a time code corresponding to the start point of an editing section;

means for displaying an image and a time code corresponding to the end point of the editing section;

means for starting a playback from the time code of the start point of the editing section and continuing the playback until the time code of the end point; and means for cutting out specified editing sections from the original video file and generating a new video file consisting only of editing sections.

11. A hierarchical video query and editing system as set forth in claim 10, further comprising:

means for displaying the time codes and images corresponding to the start and end points of a plurality of editing sections in the order of time of editing, thereby to edit a plurality of editing sections.

12. A hierarchical video query and editing system as set forth in claim 11, comprising:

a plurality of file browsing means, one for each of a plurality of video files, for editing the plurality of video files;

a plurality of first video browsing means, one for each of a plurality of video files, for editing the plurality of video files; and a plurality of second video browsing means, one for each of a plurality of video files, for editing the plurality of video files.

13. A hierarchical video query a nd editing system as set forth in claim 9, wherein motion picture data is stored in a WWW server, which is connected to a WWW browser through a network in accordance with a uniform resource locator (URL) specified by the WWW browser; the hierarchical video query and editing system further comprising:

means for sending a result of a query from the WWW server to the WWW browser by using a hyper text transfer protocol (HTTP), and displaying its image by the WWW browser;

means for displaying an image and a time code corresponding to the start point of a specified editing section informed with the HTTP from the WWW server; and editing means residing in the WWW server for editing an editing section specified by the WWW browser, after the WWW server receives information for the specified video file and editing section, to generate a new video file.

14. A hierarchical video query and editing system according to claim 13, wherein the parameters for the playback confirmation of the editing section are set on the WWW browser and wherein conditions for the playback confirmation are informed from the WWW browser to the WWW server, the hierarchical video query and editing system further comprising:

means for performing a coding rate conversion on the WWW server for a compressed motion picture file existing on the WWW server prior to sending the data to the WWW browser; and means for reducing the amount of data in a non-compressed motion picture file existing on the WWW server prior to sending the data to the WWW browser.

15. A hierarchical video query and editing system according to claim 14, wherein the means for reducing the amount of data in a non-compressed motion picture file comprises:

means for decreasing the spatial or temporal resolution of the motion picture file.

16. A hierarchical video query and editing system according to claim 15, wherein the means for reducing the amount of data in a non-compressed motion picture file comprises:

means for performing coding on the motion picture file.

17. A hierarchical video query and editing system having storage means which can access any frame of a motion picture file, said video query and editing system comprising:

file browsing means including means for specifying an image existing at a predetermined position of a specified video file and means for displaying the specified image;

first video browsing means which simultaneously displays a plurality of images existing at specified unit time intervals; and second video browsing means, which, with an image selected from the images displayed by said first video browsing means being the start point, simultaneously displays a plurality of images at specified points after said start point.

18. A hierarchical video query and editing system as set forth in claim 17, wherein the specified points are a selectable one of scene change points, single-frame intervals and multiple-frame intervals.

19. A hierarchical video query and editing system as set forth in claim 18, further comprising:

means for specifying a start point and an end point for images displayed in the first video browsing means and second video browsing means;

means for displaying an image and a time code corresponding to the start point of an editing section;

means for displaying an image and a time code corresponding to the end point of the editing section;

means for starting a playback from the time code of the start point of the editing section and continuing the playback until the time code of the end point; and means for cutting out specified editing sections from the original video file and generating a new video file consisting only of editing sections.

20. A hierarchical video query and editing system as set forth in claim 19, further comprising:

means for displaying the time codes and images corresponding to the start and end points of a plurality of editing sections in the order of time of editing, thereby to edit a plurality of editing sections.

21. A hierarchical video query and editing system as set forth in claim 20, comprising:

a plurality of file browsing means, one for each of a plurality of video files, for editing the plurality of video files;

a plurality of first video browsing means, one for each of a plurality of video files, for editing the plurality of video files; and a plurality of second video browsing means, one for each of a plurality of video files, for editing the plurality of video files.

22. A hierarchical video query and editing system as set forth in claim 17, wherein motion picture data is stored in a WWW server, which is connected to a WWW browser through a network in accordance with a uniform resource locator (URL) specified by the WWW browser, the hierarchical video query and editing system further comprising:

means for sending a result of a query from the WWW server to the WWW browser by using a hyper text transfer protocol (HTTP), and displaying its image by the WWW browser;

means for displaying an image and a time code corresponding to the start point of a specified editing section informed with the HTTP from the WWW server; and editing means residing in the WWW server for editing an editing section specified by the WWW browser, after the WWW server receives information for the specified video file and editing section, to generate a new video file.

23. A hierarchical video query and editing system according to claim 17, wherein the parameters for the playback confirmation of the editing section are set on the WWW browser and wherein conditions for the playback confirmation are informed trom the WWW browser to the WWW server, the hierarchical video query and editing system further comprising:

means for performing a coding rate conversion on the WWW server for a compressed motion picture file existing on the WWW server prior to sending the data to the WWW browser; and means for reducing the amount of data in a non-compressed motion picture file existing on the WWW server prior to sending the data to the WWW browser.

24. A hierarchical video query and editing system according to claim 23, wherein the means for reducing the amount of data in a non-compressed motion picture file comprises:

means for decreasing the spatial or temporal resolution of the motion picture file.

25. A hierarchical video query and editing system according to claim 23, wherein the means for reducing the amount of data in a non-compressed motion picture file comprises:

means for performing coding on the motion picture file.

* * * * *

UNITED STATES PATENT AND TRADEMARK OFFICE
CERTIFICATE OF CORRECTION

PATENT NO. : 6,026,389
DATED : February 15, 2000
INVENTOR(S) : Nakajima et al.

It is certified that error appears in the above-identified patent and that said Letters Patent is hereby corrected as shown below:

Col. 13, please make lines 43 through 48 into one paragraph which will read as follows:

> second video browsing means, which, with an image selected from the images displayed by said first video browsing means being the start point, simultaneously displays a plurality of images at scene change points existing after said start point.

Signed and Sealed this

Thirteenth Day of February, 2001

Attest:

NICHOLAS P. GODICI

*Attesting Officer*   *Acting Director of the United States Patent and Trademark Office*